United States Patent
Wittenbecher et al.

(10) Patent No.: US 7,431,328 B2
(45) Date of Patent: Oct. 7, 2008

(54) METHOD FOR GENERATING A PREDETERMINED BREAK LINE IN A MULTILAYER AIRBAG COVER USING A LASER

(75) Inventors: Wolfgang Wittenbecher, Gumperda (DE); Martin Griebel, Jena (DE); Norbert Preuss, Jena (DE)

(73) Assignee: Jenoptik Automatisierungstechnik GmbH, Jena (DE)

( * ) Notice: Subject to any disclaimer, the term of this patent is extended or adjusted under 35 U.S.C. 154(b) by 0 days.

(21) Appl. No.: 11/624,831

(22) Filed: Jan. 19, 2007

(65) Prior Publication Data
US 2007/0170160 A1   Jul. 26, 2007

(30) Foreign Application Priority Data
Jan. 24, 2006   (DE) .................. 10 2006 003 684

(51) Int. Cl.
B60R 21/20 (2006.01)

(52) U.S. Cl. .................................. 280/728.3
(58) Field of Classification Search ........... 280/728.3; 219/121.68, 121.69, 121.7, 121.71
See application file for complete search history.

(56) References Cited

U.S. PATENT DOCUMENTS

| | | | |
|---|---|---|---|
| 5,968,381 A | 10/1999 | Nusshör | |
| 6,337,461 B1 | 1/2002 | Yasuda et al. | |

FOREIGN PATENT DOCUMENTS

| | | |
|---|---|---|
| DE | 295 11 172 | 3/1996 |
| DE | 196 36 429 | 11/1997 |
| DE | 198 19 573 | 11/1998 |
| DE | 101 28 746 | 1/2003 |
| DE | 102 27 118 | 1/2004 |
| DE | 103 52 581 | 6/2005 |
| DE | 10 2004 047 634 | 8/2005 |
| EP | 1 468 878 | 3/2004 |
| WO | 99/01317 | 1/1999 |
| WO | 02/26534 | 4/2002 |

OTHER PUBLICATIONS

Patent Abstracts of Japan, Publication No. 2002166809 published Jun. 11, 2002 "Vehicular Interior Trim Material having Weakened Line Portion for Inflating Air Bag" Honda Motor Co Ltd.
Patent Abstracts of Japan, Publication No. 2002166811 published Jun. 11, 2002 "Machining Method for Weakened Line Part for Developing Air Bag" Honda Motor Co Ltd.
Patent Abstracts of Japan, Publication No. 2002254185 published Sep. 10, 2002 "Fragile Part Forming Method and Device for Air Bag" Honda Motor Co Ltd.

*Primary Examiner*—Faye M. Fleming
(74) *Attorney, Agent, or Firm*—Reed Smith LLP

(57) ABSTRACT

The invention is directed to a method for introducing a predetermined break line in a multilayer airbag covering with a carrier layer, a supporting layer and a decorative layer by a laser. In order to prevent an undesirable burning of the supporting layer over a large area as a result of the occurring combustion gases, it is suggested that the carrier material is ablated by a width that is greater than the diameter of the impinging beam to facilitate the escape of the combustion gases.

12 Claims, 1 Drawing Sheet

METHOD FOR GENERATING A PREDETERMINED BREAK LINE IN A MULTILAYER AIRBAG COVER USING A LASER

CROSS-REFERENCE TO RELATED APPLICATION

This application claims priority of German Application No. 10 2006 003 684.0, filed Jan. 24, 2006, the complete disclosure of which is hereby incorporated by reference.

BACKGROUND OF THE INVENTION a) Field of the Invention

The invention is directed to a method for generating a predetermined break line in a multilayer airbag covering in which the material of a carrier layer has a greater density than the material of an adjoining supporting layer adjoined by a decorative layer. A generic method of this kind is known from DE 102 27 118 A1.

b) Description of the Related Art

Many methods are known for introducing a predetermined break line in a multilayer airbag covering. Initially, only the dashboard or steering wheel hub were used as airbag coverings for covering a front airbag. In the meantime, it has become standard also for door panels and seat upholstery to cover a side airbag, for the inside roof lining to cover a head airbag, or even for the safety belt to cover a front airbag, e.g., for the rear passengers.

This has increased not only the variety of airbag covering constructions but also the variety of materials that are used to produce multilayer airbag coverings for this purpose. Currently, the most common layer construction for an airbag covering comprises a rigid carrier layer, e.g., of plastic or natural bonded fiber, a soft supporting layer, e.g., of foamed material or a spacer fabric, and a decorative layer, e.g., of plastic, woven textile or leather. In a layer construction of this kind, the material density of the carrier layer is appreciably greater than that of the supporting layer.

Although it is not expressly mentioned in all of the relevant publications, a predetermined break line with a defined tear resistance must be produced in principle and should be invisible from the passenger compartment (decorative side of the airbag covering) for aesthetic reasons.

The relevant prior-art methods for producing a predetermined break line of the type mentioned above differ substantially with respect to the sequence of individual method steps on one hand and the application of different cutting techniques on the other hand.

With regard to the technical sequence, the methods can be grouped according to whether the layer construction of the airbag covering is produced first and then a predetermined break line is introduced in the prefabricated airbag covering, or whether a predetermined break line is introduced in individual layers before these layers are assembled.

The different cutting techniques are essentially defined by the application of different tools. Mechanical cutting tools or chip-removing tools, heat knives, ultrasonic knives, and lasers are used for this purpose.

In recent years, laser methods in particular have progressed and expanded in application. For a layer construction of the type described above, lasers are especially advantageous in that no mechanical pressure is exerted on the workpiece (in this case, the airbag covering). Further, the tool is not subject to wear, which is particularly beneficial for large-scale production as in the automobile supplier industry. Further, it is advantageous that different ablation regimes which may be advantageous for different material compositions can be realized in a simple manner by selecting suitable laser parameters such as laser output and pulse frequency. Further, ablation can be regulated by detecting the working beam transmitted to the ablation site through the residual material or when there is an opening in the material.

In all of the known prior-art laser methods in which a predetermined break line is introduced in a prefabricated airbag covering having a layer construction of the type described above, a laser beam is directed to the airbag covering on the carrier layer side and is moved long the desired predetermined break line relative to the airbag covering. It is known to select the type of laser beam and its wavelength, the laser output, the relative speed, pulse duration, and pulse frequency depending on the layer construction and to regulate the variable laser parameters depending on the ablation depth or residual wall thickness.

As was already mentioned, the predetermined break line must have a reproducible tear resistance defined along its length. The tear resistance should be low enough so that, on the one hand, the predetermined break line can be destroyed by only a slight tearing force in case the airbag is activated and, on the other hand, so that the predetermined break line does not break already due to an uncontrolled random force acting on the passenger compartment side. An ablation regime is selected depending on a correspondingly suitable tear resistance and the material characteristics and material thickness of the individual layers. The remaining webs of material in the different layers, their widths and spacing, and the ablating depth determine the tear resistance along the predetermined break line.

Aside from a suitable reproducible tear resistance, it must also be ensured that the predetermined break line remains invisible over the long term. On the one hand, this means that the decorative layer may not be overly weakened by too great an ablation depth, and on the other hand the supporting layer must be retained as far as possible.

To solve this problem, it is known, for example, from DE 196 36 429 C1, to generate the weakened line by means of a series of blind holes. The blind holes extend completely through the carrier layer and the supporting layer into the decorative layer leaving a remaining residual wall thickness. Instead of blind holes, a satisfactory predetermined break line can also be generated by means of microperforations which are not perceptible to the naked eye.

However, practical experience has shown that these blind holes or microperforations have a nearly constant diameter only in the region of the carrier layer. In the region of the supporting layer, the blind holes undergo a distinct bubble-like expansion. The increased ablating volume in the supporting layer can be explained particularly in that the material density is substantially lower than in the carrier layer. In addition to the evaporation caused by the laser, the hot combustion gases also promote evaporation of the material. The combustion gases which can only escape in limited quantity via the opening of the respective blind hole in the carrier layer cause extensive displacement of the supporting layer due to their pressure combined with their temperature which accelerates the softening of the supporting layer.

Accordingly, in order to obtain webs in the supporting layer with an effective minimum width between the individual blind holes, there must be a defined minimum distance between the centers of the holes that is greater than the maximum diameter of the blind holes in the region of the supporting layer. For decorative layers with a high tear resistance, this distance may be too great for generating a weakened line with the desired tear resistance.

As a solution to this problem, the Applicant describes in Patent Application DE 102 27 118 A1 how groups of blind holes of different depth are deliberately generated. A first group extends only in the carrier layer so that the supporting layer lying above the latter is retained and a wide web is formed as a support for the decorative layer. A second group penetrates the supporting layer into the decorative layer. The distances between the hole centers can be selected so as to be small enough that webs are only retained in the decorative layer. Regardless of the distance, the supporting layer is destroyed in this ablation regime. This means that a smaller spacing causes a greater weakening of the decorative layer without affecting the supporting action of the supporting layer.

The weakening may also be unsatisfactory in this method when the tear resistance of the decorative layer is very high.

OBJECT AND SUMMARY OF THE INVENTION

It is the primary object of the invention to provide a method using a laser by which a predetermined break line in the form of a perforation line can be generated in a terminating decorative layer in a multilayer airbag covering, wherein broader webs are retained in an adjoining supporting layer compared to known methods in spite of smaller distances between the centers of the holes.

According to the invention, this object is met in a method for generating a predetermined break line in a multilayer airbag covering with a carrier layer, a supporting layer and a decorative layer. The method comprises the steps of providing that material of the carrier layer has a greater density than material of the supporting layer; generating blind holes or microperforations which are spaced apart along a desired predetermined break line in the decorative layer by a laser which impinges upon the airbag covering with a beam diameter (a) and which has a Gaussian beam density distribution: providing that the material of the carrier layer is completely ablated over a width (b) along the predetermined break line at least in the spaces between the spaced blind holes or microperforations, where (b) is greater than (a); generating the spaced blind holes or microperforations through the openings created in the carrier layer by the laser; and allowing the combustion gases that occur to escape through the openings.

It is essential to the invention that the ablation in the carrier layer is carried out so as to be deliberately broader than the diameter of the beam impinging on the airbag covering, or more exactly the supporting layer, for working the decorative layer so that the combustion gases occurring during the evaporation or combustion of the supporting layer and decorative layer can escape and not lead to undesirably large hollow spaces in the supporting layer. The ablation width is preferably greater than twice the diameter. The specific width at which a minimum combustion volume and therefore a minimum hollow space occurs in the supporting layer can be quickly determined by a few practical trials. The material characteristics of the supporting layer and its thickness in particular determine the rate of gas development and the amount of the occurring combustion gas volume.

In practice, the supporting layer which is connected to the decorative layer can be lasered without a carrier layer in a first trial. The combustion volume that occurs in so doing is a guideline for the minimum attainable combustion volume for subsequent trials. In the subsequent trials in which the complete layer construction is lasered, the carrier layer can first be provided with progressively larger openings. In this way, it is possible to gradually approximate an opening size which does not excessively weaken the carrier but allows the combustion gas to escape sufficiently quickly.

The openings can be constructed as individual holes whose center-to-center hole spacing is the same as that of the blind holes in the decorative layer. However, they can also be smaller than width b so that the holes overlap and no web remains in the carrier layer between the holes. However, a web width remaining at least between individual overlapping hole groups can be useful as a stabilizing connection in the carrier layer. In that case, it is possible to make the openings larger over their width rather than over their length along the predetermined break line. In contrast to an increasing length, an increasing width has no effect on the tear resistance of the carrier layer but enlarges the opening to the same degree.

The ablation in the carrier layer and in the decorative layer can be carried out at the same time, at overlapping times, or consecutively. It is compulsory that the carrier layer is ablated through its entire thickness. The supporting layer advantageously remains unaffected by this ablation. With thicker supporting layers, however, a slight ablation of the supporting layer also does not have disadvantageous results.

The invention will be described more fully in the following with reference to embodiment examples.

DESCRIPTION OF THE PREFERRED EMBODIMENTS

The method according to the invention is used for working a multilayer airbag covering with a rigid carrier layer 1 and a supporting layer 2 succeeding the latter as was noted in the description of the prior art. The supporting layer 2 is made from a material with a lower density than that of the material of the carrier layer 1. The supporting layer 2 is followed by at least one other layer, namely, the decorative layer 3.

In a first embodiment example, the ablation in the carrier layer 1 and the ablation in the decorative layer 3 are carried out at the same time, i.e., the ablation in the carrier layer 1, in the supporting layer 2 and in the decorative layer 3 are carried out directly one after the other at one place. A laser beam with an expanded annular beam density distribution is selected for working the carrier layer 1, the beam being directed to the carrier layer 1 (see FIG. 3) coaxial to a laser beam with Gaussian beam density distribution. The two laser beams act on the airbag covering simultaneously. After the carrier layer 1 is ablated through its entire thickness at this location in the form of a round hole with a diameter twice as great as (a) in cooperation with the two laser beams, the laser is turned off and the ablation continues through the supporting layer 2 into the decorative layer 3 by means of the second laser whose beam cross section in the working area has a diameter (a) (see FIGS. 1 and 2). It will be clear to the person skilled in the art that diameter (a), which is ideally equal to the focusing diameter of the laser beam, is not ideally constant over the entire thickness of the airbag covering. However, these deviations are comparatively insignificant.

Figure 4:
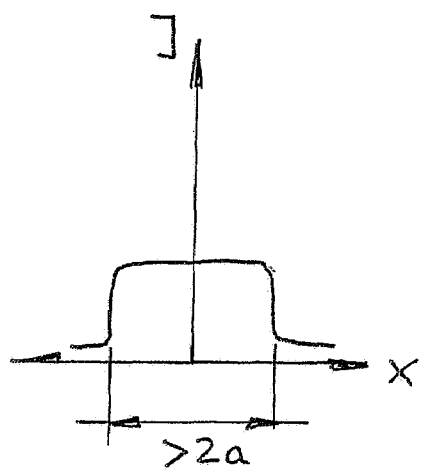
FIG. 4 shows the beam profiles of two lasers according to a second embodiment example.

In a second embodiment example, a laser with a top head beam profile is used for the ablation in the carrier (see FIG. 4). The ablation in the decorative layer 3 is carried out after a delay.

Figure 1:
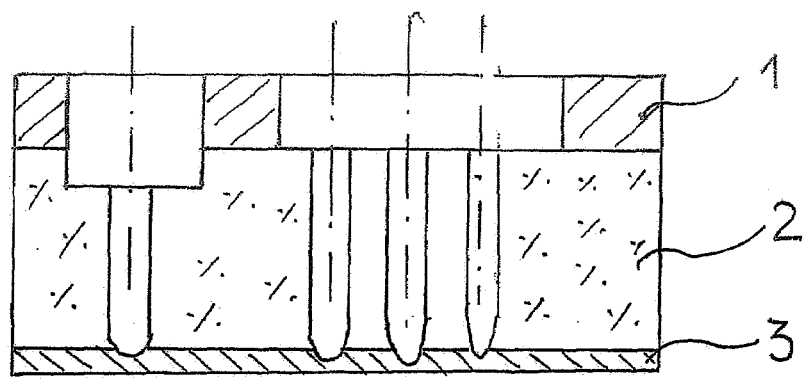
FIG. 1 shows a schematic sectional diagram of an airbag covering which is cut according to the invention.
Figure 2:
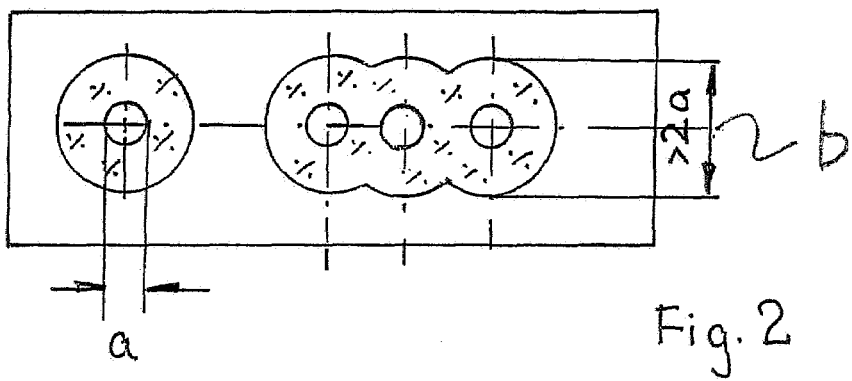
FIG. 2 shows a schematic top view of an airbag covering which is cut according to the invention.
Figure 3:
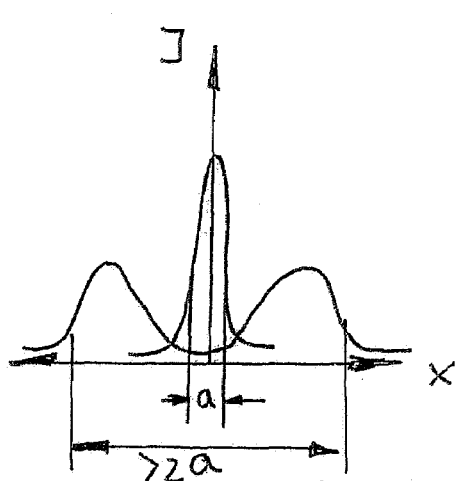
FIG. 3 shows the beam profiles of two lasers according to a first embodiment example.

The overlapping ablation in the carrier forms an opening which, in contrast to the first embodiment example, does not have an approximately round hole shape but rather extends more in direction of the predetermined break line, i.e., a slit-shaped opening (see the right-hand views in FIGS. 1 and 2). Alternatively, the openings in the carrier layer can have the shape of a hole or slit, or the shapes can be combined within one predetermined break line.

The advantage of delayed lasering of the decorative layer 3 consists in that the combustion gases developing at the respective ablation site when ablating the carrier layer have already evaporated and that the quantity of blind holes along the length of the slit-shaped ablation can be selected independent from the ablation of the carrier layer 1.

In a third embodiment example, the ablation is carried out successively. For this purpose, it is advantageous that two lasers need not necessarily be used, and more than 10 blind holes or perforations can be introduced by means of a laser in a slot which is formed, e.g., by 10 overlapping hole-shaped openings. When working the carrier with laser beams as was described in the two first embodiment examples, the beam profile of the laser with Gaussian distribution, which is needed in any case for the ablation in the decorative layer 3, can be modified by arranging special optics, e.g., an axicon, in front of it, which forms an annular beam density distribution from a Gaussian beam density distribution. The laser can also be used with its Gaussian beam density distribution when it is directed to the carrier material with corresponding defocusing.

When using a laser for ablation in the carrier layer 1, it may be advantageous regardless of the beam profile to introduce a foil-type barrier layer between the carrier layer 1 and the supporting layer 2 when producing the airbag covering before implementing the method. The function of this foil-type barrier layer is to prevent laser radiation from penetrating into the supporting layer 2 during the ablation of the carrier material. The barrier layer is advantageously permeable to gas. In order to prevent damage to the barrier layer during the ablation of the carrier material, a material whose melting temperature is above the evaporation temperature of the carrier material must be used for the barrier layer.

When the barrier layer is not permeable to gas, it must be destroyed after the ablation of the carrier material. This can be carried out during the ablation of the decorative layer 3 by the higher energy input in the radiation peak of the laser or by mechanical destruction, e.g., by means of a knife. It is sufficient to introduce a slit in order for the barrier layer to be blown apart by the pressure of the combustion gases so that the combustion gas can escape.

Instead of using lasers to ablate the carrier layer 1, a chip-removing tool can also be used for all three time regimes mentioned in the embodiment examples. For simultaneous ablation, a special cutter having a hollow core through which the laser radiation can be directed can be used, for example. Conventional drills or cutters in particular can be used for delayed ablation and ablation which is carried out consecutively.

While the foregoing description and drawings represent the present invention, it will be obvious to those skilled in the art that various changes may be made therein without departing from the true spirit and scope of the present invention.

What is claimed is:

1. A method for generating a predetermined break line in a multilayer airbag covering with a carrier layer, a supporting layer and a decorative layer, in which the material of the carrier layer has a greater density than that of the supporting layer comprising the steps of:

generating blind holes or microperforations which are spaced apart along a desired predetermined break line in the decorative layer by a laser which impinges upon the airbag covering with a beam diameter (a) and which has a Gaussian beam density distribution;

providing that the material of the carrier layer is completely ablated along the predetermined break line, over a width (b), width (b) being defined as a dimension transverse to the break line, at least in the spaces of the blind holes or microperforations, where (b) is greater than (a);

generating the spaced blind holes or microperforations through the openings created in the carrier layer by the laser; and allowing the combustion gases that occur to escape through the openings.

2. The method according to claim 1, wherein the width (b) is greater than twice the beam diameter (a).

3. The method according to claim 1, wherein the openings are slit-shaped.

4. The method according to claim 1, wherein the openings have a round hole shape whose diameter is equal to the width (b).

5. The method according to claim 3, wherein the openings are produced by a cutter.

6. The method according to claim 4, wherein the openings are produced by a drill.

7. The method according to claim 1, wherein the openings are produced by a laser.

8. The method according to claim 7, wherein there is a top head shape.

9. The method according to claim 7, wherein the laser beam for producing the openings has a beam density distribution whose profile is ring-shaped.

10. The method according to claim 7, wherein the laser beam for producing the openings has a beam density distribution whose profile is Gaussian, and the laser beam impinges on the carrier in a defocused manner.

11. The method according to claim 7, wherein a barrier layer is introduced between the carrier layer and the supporting layer when producing the airbag covering for preventing energy from being introduced into the supporting layer during the working of the carrier layer.

12. The method according to claim 11, wherein a material which is permeable to gas is used for the barrier layer.

* * * * *